May 27, 1924.
H. A. KONKOWSKI
AUTOMATIC TIRE GAUGE
Filed Nov. 18, 1920
1,495,599
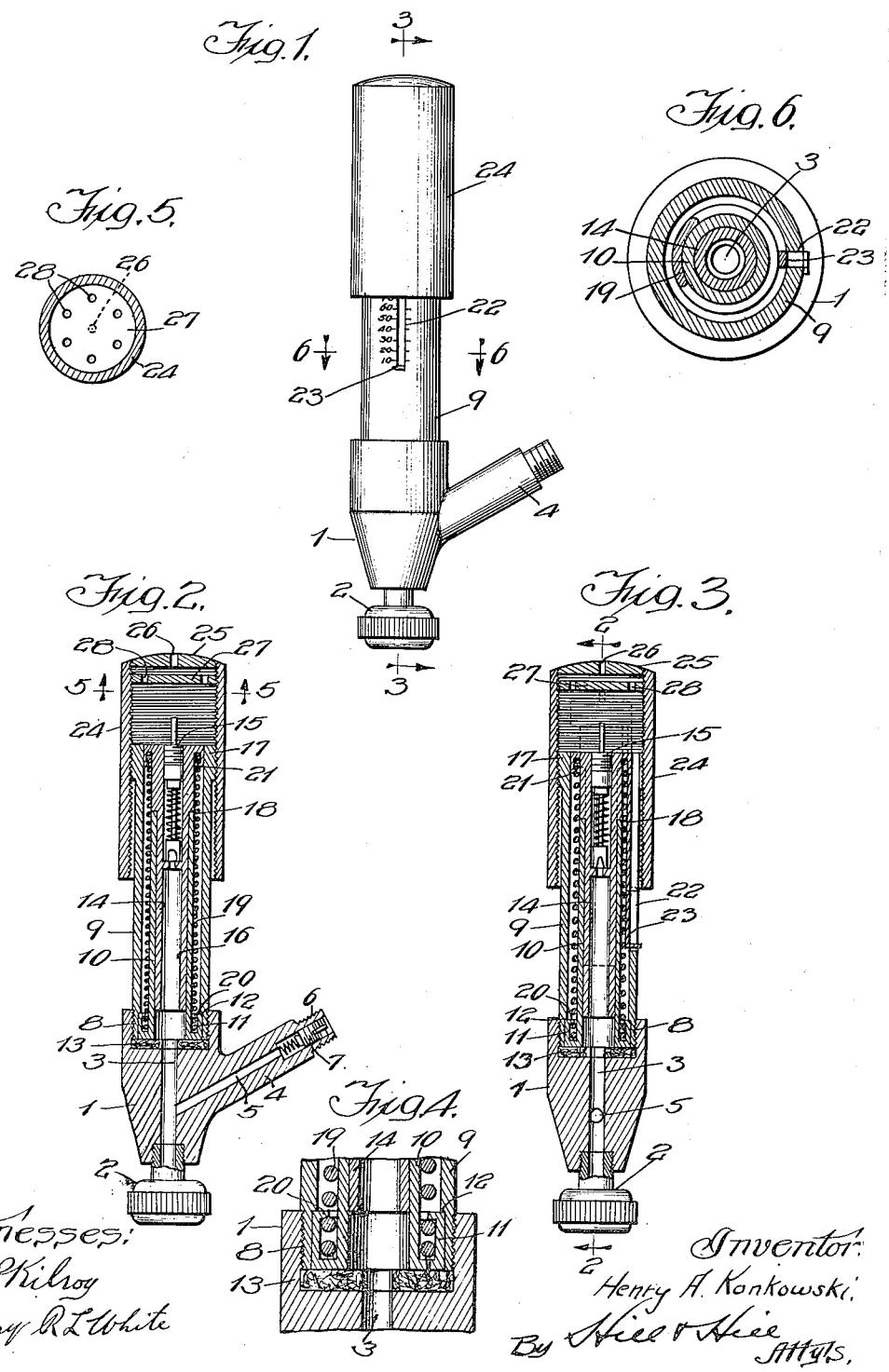

Patented May 27, 1924.

1,495,599

UNITED STATES PATENT OFFICE.

HENRY A. KONKOWSKI, OF CHICAGO, ILLINOIS, ASSIGNOR OF ONE-HALF TO MARTIN V. KONKOWSEI, OF CHICAGO, ILLINOIS.

AUTOMATIC TIRE GAUGE.

Application filed November 18, 1920. Serial No. 424,984.

*To all whom it may concern:*

Be it known that I, HENRY A. KONKOWSKI, a citizen of the United States, residing at Chicago, in the county of Cook and State of Illinois, have invented certain new and useful Improvements in an Automatic Tire Gauge, of which the following is a description.

My invention relates to improvements in pressure gauges and more particularly to those gauges used for indicating the pressure in auto tires. My invention comprises a pressure indicator which, in its preferred form, is applied directly to a tire valve of any standard construction, and the source of air supply connected to the indicator so that the pressures within the tire casing are indicated continually during the inflation.

My invention further provides means for automatically relieving the air pressure within the tire when it has reached a predetermined amount, rendering it impossible to accidentally pump the tire to any greater pressure than that for which the indicator is set.

Another object of my invention is to provide an adjustable pressure-relief valve which may be quickly and conveniently set for relief at any desired pressure.

Another object of my invention is to provide means which will give an audible signal when the tire has been inflated to its proper pressure. With these and other objects and advantages in view, my invention consists in the novel construction, arrangement, and combination of parts herein shown and described and more particularly pointed out in the claims.

In the drawings, wherein like reference characters indicate like or corresponding parts, Figure 1 is a vertical elevation of the device;

Figure 2 is a vertical section taken on line 2—2 of Fig. 3;

Figure 3 is a vertical section taken on line 3—3 of Fig. 1;

Figure 4 is an enlarged fragmentary detail of the vertical section of Fig. 2;

Figure 5 is a horizontal section taken on line 5—5 of Fig. 2; and

Figure 6 is a horizontal section taken on line 6—6 of Fig. 1, showing the parts enlarged.

Referring more particularly to the drawings, 1 indicates the base of the gauge, said base having a coupling 2 connected therewith and swiveled so that it is adapted to be screwed onto the end of a standard tire valve shell and open the valve therein. A bore 3 extends from one end of the base to the other and communicates with the coupling 2.

Leading to the bore 3 and to the coupling member 2, is an air inlet 4, centrally bored at 5, and having its end threaded at 6 so that it may engage the threads of a pump coupling, and having a check valve therein of any suitable type, such as the Shraeder valve. The end of the base opposite the coupling 2 is recessed and internally threaded, as shown at 8, so as to receive the externally threaded end of a hollow casing 9, which is screwed into said recess to retain it to the base. The other end of the casing 9 is also externally threaded, for a purpose to be hereinafter described.

Arranged coaxially within the casing 9 is a guide sleeve 10, having an enlarged or flanged head 11 adapted to bear against a recessed shoulder 12 on the end of the casing 9, whereby it may be fixedly clamped between the shoulder 12 and the base 1, the sleeve 10 being of a lesser length than the length of the casing 9.

A gasket 13 is preferably inserted between the base 1 and the ends of the sleeve and casing so as to prevent any air leakage therebetween. Coaxially arranged within the sleeve is a hollow piston 14 in free communication with the air passage 3 of the base, and having its head end closed by a check valve 15 of the Shraeder or any equivalent or preferred type. The piston has a reduced portion 16, and is adapted to reciprocate or slide longitudinally upon the inner wall of the guide sleeve 10, and also has an enlarged flanged head portion 17 which slides on the inner wall of the casing 9 when the piston reciprocates. Between the reduced and enlarged portions of the piston is an intermediate portion having an annular shoulder 18, which is adapted to bear against the free end of the sleeve 10 to limit the movement of the piston in one direction.

Secured between the flanges 11 and 17, and concentrically arranged between the inner wall of the casing and the outer wall of the sleeve, is a spring 19 having one end secured to the flange 11 of the stationary sleeve, and having its other end secured to the flange 17 of the movable piston, whereby the piston and the sleeve are resiliently held together. Both the flanges 11 and 17 are peened or spun over, as at 20 and 21 respectively, so as to secure the ends of the spring against accidental displacement.

Extending longitudinally of the casing wall is a slot 22 adapted to receive an extending indicator arm 23 therein, said arm being integral with its upper end or otherwise suitably secured to the piston so as to move longitudinally therewith. Thin pin and slot connection between the piston and casing prevents any rotational movement between the casing and piston. Suitable graduations or other indicating marks may be formed on the casing near the slit, cooperating with the extended end of the indicator 23, as shown in Figure 1.

The outer end of the casing is threaded to receive a cap 24, said cap being internally screw-threaded so as to cooperate with the threads on the casing. The closed end of the cap 25 may be integral with the cap, or it may be a separate insert if so desired, and has a vent 26 therein.

Adjustably arranged within the cap is a plate 27 having vents 28 therein, said plate being adapted to cooperate with and open the check valve 15 in the piston head at a predetermined pressure. Air passing from the valve 15 will pass through the vents 28 and 26 and cause an audible sound or signal.

The operation of the mechanism will now be explained. The cap 24 is first set to any desired pressure mark, as for instance at 70 pounds per square inch, as shown in Fig. 1. The device is then applied to the tire valve and air is admitted through the inlet valve 7 to the tire, said air also being in free communication with the piston 16. As the pressure rises, the piston will move longitudinally outward against the spring tension, as indicated by dotted lines in Fig. 3, and when 70 pounds pressure has been reached, the valve 15 will just be in contact with the abutment plate 27. Any further movement of the piston will cause the valve 15 to open and permit the air to freely escape to the atmosphere through the vents 26 and 28, causing the signal to be given.

Thus it is seen that any desired pressure may be put into the tire simply by setting the cap 24 to any position on the casing, whereby the cap limits the distance through which the spring-held piston may move before its valve is opened.

The device may be used as an ordinary pressure gauge to determine the pressure in an already filled tire, by applying it to the tire stem and then screwing down the cap until the abutment plate contacts with the piston valve stem. The pressure in the tire is thus indicated on the scale by the position of the cap 24. The abutment plate 28 is adjustable within the cap so that it may be positioned to compensate for any change in the length of the spring which might occur after the spring has been in use for a considerable period.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:

1. In a device of the class described, the combination of a body having means whereby air may be admitted therethrough, a hollow casing secured to said body, an immovable guide sleeve within said casing, a piston non-rotatably slidable in and bearing against said sleeve, and a spring for yieldingly holding said piston against longitudinal movement in said sleeve, said spring having one end secured to said piston and its other end secured to said sleeve, said piston being actuated by said air pressure.

2. In a device of the class described, the combination of a body having means whereby air may be admitted therethrough, a hollow casing secured to said body, a stationary guide sleeve within said casing, and secured to said base, a piston non-rotatably slidable in and bearing against said sleeve and a spring for yieldingly holding said piston against longitudinal movement in said sleeve, said spring having one end secured to said piston and its other end secured to said sleeve, said piston being actuated by said air pressure.

3. In a device of the class described, the combination of a body having means whereby air may be admitted therethrough, a hollow casing secured to said body, an immovable guide sleeve within said casing, said sleeve having a flange thereon extending backwards of the sleeve and forming an annular recess thereabout, said flange being clamped between said casing and base, a piston non-rotatably slidable in said sleeve, and a spring for yieldingly holding said piston against longitudinal movement in said casing, said spring having one end secured to said piston and its other end secured to said sleeve flange in said annular recess, said piston being actuated by said air pressure.

In testimony whereof, I have hereunto signed my name in the present of two subscribing witnesses.

HENRY A. KONKOWSKI.

Witnesses:
JOHN W. HILL,
BERTHA HARTMANN.